Patented Jan. 14, 1936

2,028,043

UNITED STATES PATENT OFFICE 2,028,043

CUMYL PHENOL

Edgar C. Britton, Midland, Mich., and Lawrence F. Martin, New Orleans, La., assignors to The Dow Chemical Company, Midland, Mich., a corporation of Michigan No Drawing. Application February 13, 1934, Serial No. 711,068

4 Claims. (Cl. 260—64)

This invention concerns a new compound, alpha-phenyl-isopropyl-phenol (hereinafter referred to as cumyl phenol), as well as methods of making the same. In order to avoid use of complex nomenclature in referring to the compounds herein dealt with, the compound alpha-hydroxy-isopropyl-benzene is termed "cumol" and the alpha-phenyl-isopropyl radical is, in each instance, referred to as the "cumyl" radical. Thus, an alpha-halo-isopropylbenzene is termed a "cumyl halide".

We have found that cumyl phenol can be prepared in good yield and at low cost from cumol by converting the latter into a cumyl halide and reacting the cumyl halide with phenol. The reactions involved are:—

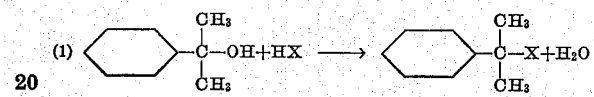

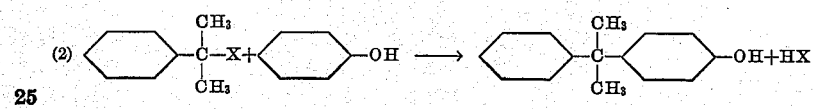

wherein X represents a halogen.

Cumol may conveniently be prepared from acetone and a phenyl magnesium halide by known procedure. It is converted into a cumyl halide by passing a gaseous hydrogen halide, e. g. hydrogen chloride or hydrogen bromide, into the same. The reaction mixture is preferably maintained at a temperature below 10° C. during such operation, since the reaction proceeds most smoothly and with minimum loss, i. e., by vaporization, of the reaction components under such conditions. However, the reaction can be carried out at a considerably higher temperature, e. g. 70° C., if desired. After the reaction is completed, the cumyl halide product is dried, e. g. over calcium chloride or magnesium sulphate, and is then in condition for use in the second stage of the process.

Phenol is melted and treated with preferably between about .05 and 0.1 its molecular equivalent of an aluminum halide, e. g. aluminum chloride or bromide, although a larger proportion of the aluminum halide may be added if desired. The mixture is stirred and maintained in molten condition while the cumyl halide is gradually added thereto, preferably in amount representing approximately the molecular equivalent of the phenol. During addition of the cumyl halide a vigorous reaction occurs and hydrogen halide is evolved from the mixture. After all of the cumyl halide has been added, the mixture is heated to, and maintained at, a temperature above 40° C. until the evolution of hydrogen halide ceases. The hydrogen halide which is given off during the reaction can advantageously be re-employed in the first stage of the process for the preparation of an additional quantity of the cumyl halide.

After the reaction is completed, the catalyst is rendered inactive or removed by usual procedure, e. g. washing with dilute mineral acid or water, adding a base and filtering, etc. The cumyl phenol product is then separated by fractionally distilling the mixture, preferably under reduced pressure.

The following examples illustrate specific procedure for practicing the invention, but are not to be construed as limiting the invention.

*Example 1—Preparation of cumyl chloride*

136 grams (1 mol) of cumol was melted and supercooled to 0° C. Gaseous hydrogen chloride was passed into the cumol until 42 grams (1.15 mols) of hydrogen chloride had been absorbed in the mixture. During introduction of the hydrogen chloride, crystallization of the unreacted cumol occurred and the temperature of the mixture rose to 30° C. The resultant crystal slurry was promptly cooled to, and maintained at, between 0° and 5° C. and the reaction was continued without difficulty. After the introduction of hydrogen chloride had been completed, the mixture was permitted to stand at below 0° C. for 3 hours, after which it was washed with water and dried over anhydrous magnesium sulphate. The dried material was substantially pure cumyl chloride, the yield thereof being 145 grams or 94 per cent of theoretical, based on the quantity of cumol employed.

*Example 2—Preparation of cumyl phenol*

282 grams (3 mols) of phenol was melted and 3 grams (0.23 mol) of aluminum chloride was added thereto. To the resultant mixture, 145 grams (0.94 mol) of cumyl chloride was added gradually and with stirring during a period of about 1 hour. The mixture was maintained at about 40° C. with continued stirring until the evolution of hydrogen chloride had ceased. The reacted mixture was diluted with benzene and washed successively with dilute hydrochloric acid and water. The mixture was then fractionally distilled, first at atmospheric pressure until the benzene and unreacted phenol had been removed, and then under vacuum to separate the cumyl phenol product which distilled at 182° C. at 9 millimeters pressure. There was obtained 185 grams (1.97 mols) of unreacted phenol and 175 grams (0.825 mol) of cumyl phenol of freezing point 69° C. The cumyl phenol was recrystallized from a mixture of benzene and petroleum ether, after which it melted at 73°–75° C.

Cumyl phenol can also be prepared by condensing alpha-methyl-styrene with phenol in the presence of a catalyst, e. g. aluminum chloride, the reaction involved being illustrated by the equation

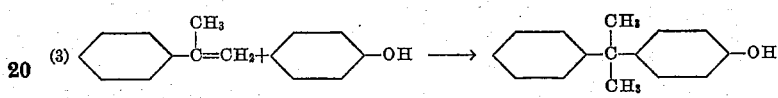

Instead of employing an aluminum halide to catalyze the reaction of a cumyl halide or of alpha-methyl-styrene with phenol, other catalysts capable of promoting a Friedel-Craft reaction, such as ferric chloride, stannic chloride, etc., may be employed.

Cumyl phenol is useful as a germicide, fungicide, etc., and is particularly useful as an intermediate for the preparation of synthetic resins.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a mtehod of making cumyl phenol, the step which consists in reacting phenol with a compound selected from the class consisting of cumyl halides and alpha-methyl-styrene in the presence of a catalyst capable of promoting a Friedel-Craft reaction.

2. In a method of making cumyl phenol, the step which consists in reacting phenol with approximately its molecular equivalent of a cumyl halide in the presence of a catalyst capable of promoting a Friedel-Craft reaction.

3. In a method of making cumyl phenol, the step which consists in reacting phenol with approximately its molecular equivalent of cumyl chloride in the presence of aluminum chloride.

4. Cumyl phenol, a compound boiling at approximately 182° C. at 9 millimeters pressure, melting at approximately 73°–75° C., and having probably the formula

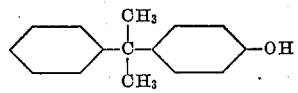

EDGAR C. BRITTON.
LAWRENCE F. MARTIN.